United States Patent
Wilson et al.

(10) Patent No.: US 10,090,764 B1
(45) Date of Patent: Oct. 2, 2018

(54) METHOD TO PROVIDE META-STABLE OPERATION OF A DC MICROGRID COMPRISING A PULSED LOAD

(71) Applicants: National Technology & Engineering Solutions of Sandia, LLC, Albuquerque, NM (US); Wayne W. Weaver, Hancock, MI (US); Rush D. Robinett, III, Tijeras, NM (US); Ronald Matthews, Houghton, MI (US)

(72) Inventors: David G. Wilson, Tijeras, NM (US); Wayne W. Weaver, Houghton, MI (US); Rush D. Robinett, III, Tijeras, NM (US); Ronald Matthews, Houghton, MI (US); Steven F. Glover, Albuquerque, NM (US)

(73) Assignees: National Technology & Engineering Solutions of Sandia, LLC, Albuquerque, NM (US); Michigan Technological University, Houghton, MI (US)

( * ) Notice: Subject to any disclaimer, the term of this patent is extended or adjusted under 35 U.S.C. 154(b) by 0 days.

(21) Appl. No.: 15/867,276

(22) Filed: Jan. 10, 2018

(51) Int. Cl.
   *H02M 3/158*   (2006.01)
   *G05F 3/08*    (2006.01)
   *H02J 1/00*    (2006.01)
   *H02J 1/02*    (2006.01)
   *H02M 1/02*    (2006.01)

(52) U.S. Cl.
   CPC ............ *H02M 3/1582* (2013.01); *G05F 3/08* (2013.01); *H02J 1/00* (2013.01); *H02M 1/02* (2013.01)

(58) Field of Classification Search
   CPC . H02M 3/1582; G05F 3/08; H02J 1/00; H02J 1/02
   See application file for complete search history.

(56) References Cited

U.S. PATENT DOCUMENTS

| | | | |
|---|---|---|---|
| 6,415,272 B1 * | 7/2002 | Ulyanov | G05B 13/0265 706/10 |
| 7,398,162 B2 * | 7/2008 | Downs | G06N 99/002 700/97 |

(Continued)

OTHER PUBLICATIONS

Weaver, W.W. et al., "Distributed Control and Energy Storage Requirements of Networked Dc Microgrids", Control Engineering Practice, 2015, pp. 10-19, vol. 44.

(Continued)

*Primary Examiner* — Timothy J Dole
*Assistant Examiner* — Sisay G Tiku
(74) *Attorney, Agent, or Firm* — Kevin W. Bieg

(57) ABSTRACT

A Hamiltonian surface shaping power flow control (HSSPFC) method is used to analyze the meta-stability and adjust pulsed power loads on a DC electric power distribution network. Pulsed power loads are nonlinear, time-variant systems that cause nonlinear limit-cycles. During the on periods of a pulsed load, the system can be in an unstable state and is damped back to stability during the off state of the load. Therefore, over the entire period of the pulse the system may only be assessed as meta-stable. As shown through simulation, HIL and hardware results, the HSSPFC method is more accurate than the other small-signal approaches, such as Eigenvalues, Nyquist, and Floquet theory, and can reveal important details about the transient responses and performance.

5 Claims, 18 Drawing Sheets

(56) References Cited

U.S. PATENT DOCUMENTS

| | | | | |
|---|---|---|---|---|
| 8,121,708 | B1* | 2/2012 | Wilson | G05B 13/04 700/45 |
| 9,140,231 | B1* | 9/2015 | Wilson | F03B 15/00 |
| 2005/0250651 | A1* | 11/2005 | Amin | B82Y 10/00 700/90 |
| 2007/0206715 | A1* | 9/2007 | Godes | G21B 3/002 376/100 |
| 2016/0141879 | A1* | 5/2016 | Motsenbocker | G05F 1/67 307/18 |

OTHER PUBLICATIONS

Doerry, N. et al., "DC Voltage Interface Standards for Naval Applications", Proc. IEEE Electric Ship Technologies Symposium, Jun. 2015, pp. 318-325.

Iden, S.M. et al., "MW Class Power System Integration in Aircraft", Proceedings SAE Tech. Paper, Nov. 2004, Paper 2004-01-3202, 7 pages.

Raczkowski, B.C. et al., "Developing Analysis for Large Displacement Stability for Aircraft Electrical Power Systems", Proceedings SAE Tech. Paper, Sep. 2014, Paper 2014-01-2115, 8 pages.

Raczkowski, B.C. et al., "Large Displacement Stability by Design for Robust Aircraft Electric Power Systems", Proceedings SAE Tech. Paper, Oct. 2012, Paper 2012-01-2197, 11 pages.

Gries, M. et al., "Designing for Large-Displacement Stability in Aircraft Power Systems", SAE International Journal Aerospace, 2008, pp. 894-902, vol. 1.

Middlebrook, R.D. "Input Filter Considerations in Design and Application of Switching Regulators", Proc. IEEE Ind. Appl. Soc. Annu. Meeting, 1976, pp. 366-382.

Waldrick, C.M. et al., "A Method of Defining the Load Impedance Specification for a Stable Distributed Power System", IEEE Transactions on Power Electronics, 1995, pp. 280-285, vol. 10.

Sudhoff, S.D. et al., "Admittance Space Stability Analysis of Power Electronic Systems", IEEE Transactions on Aerospace Electronic Systems, 2000, pp. 965-973, vol. 36.

Klausmeier, C.A. "Floquet Theory: A Useful Tool for Understanding Nonequilibrium Dynamics", Theoretical Ecol., 2008, pp. 153-161, vol. 1.

Majstorovic, D. et al., "Ultralow-Latency Hardware-in-the-Loop Platform for Rapid Validation of Power Electronics Designs", IEEE Transactions on Industrial Electronics, 2011, pp. 4708-4716, vol. 58.

* cited by examiner

METHOD TO PROVIDE META-STABLE OPERATION OF A DC MICROGRID COMPRISING A PULSED LOAD

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to electrical microgrids and, in particular, to a method to provide meta-stable operation of a DC microgrid having a pulsed load.

BACKGROUND OF THE INVENTION

The electric warship is an enabling technology to enhance propulsion, add flexibility and adaptability to energy routing in the ship and to eliminate the need to carry unstable munitions through electric weapons. Pulsed loads on an electric ship are becoming more prevalent as ship component technologies move to more electric power. Many new naval loads, such as electromagnetic aircraft launch (EMAL) systems, rail-guns, lasers, and radar operate as a pulsed load when active. See A. Gattozzi et al., "Power system and energy storage models for laser integration on naval platforms," *Proc. IEEE Elect. Ship Technol. Symp.*, June 2015, pp. 173-180; M. Steurer et al., "Analysis of experimental rapid power transfer and fault performance in dc naval power systems," *Proc. IEEE Elect. Ship Technol. Symp.*, June 2015, pp. 433-440; and V. Salehi et al., "Pulse-load effects on ship power system stability," *Proc. Annu. Conf. IEEE Ind. Electron. Soc.*, November 2010, pp. 3353-3358. However, these pulsed loads can have a destabilizing effect on the ship's power distribution network. The electric weapon loads that are being added to electric ships are constant power when active, but are typically operated as a repetitive pulse train sequence with a power magnitude, duty cycle and period. For example, the power to a laser or an EMAL system may have a large power magnitude, but is operated in short bursts with a period of seconds. Other loads such as railguns may have periods on the order of minutes, but pulse widths in the milliseconds. Typically, these types of loads are modeled as constant power and are analyzed for stability with small-signal models and techniques. However, small-signal methods are insufficient for pulse power load stability. A typical linear Nyquist analysis may show the system is unstable for the power magnitude of the pulse, yet the method cannot accurately predict the stability of a pulse train for these loads which have nonlinear limit cycle behavior. See R. D. Robinett III and D. G. Wilson, *Nonlinear Power Flow Control Design: Utilizing Exergy, Entropy, Static and Dynamic Stability, and Lyapunov Analysis*, New York, N.Y., USA: Springer, 2011; R. D. Robinett III and D. G. Wilson, *Int. J. Exergy* 6(3), 357 (2009); and R. D. Robinett III and D. G. Wilson, *Int. J. Control* 81(12), 1886 (2008).

Much research has been performed on the destabilizing effects of constant power or negative impedance loads in DC systems. See R. D. Middlebrook, "Input filter considerations in design and application of switching regulators," *Proc. IEEE Ind. Appl. Soc. Annu. Meeting*, 1976, pp. 366-382; W. W. Weaver and P. T. Krein, "Mitigation of power system collapse through active dynamic buffers," *Proc. IEEE Power Electron. Specialists Conf.*, 2004, vol. 2, pp. 1080-1084; M. N. Marwali et al., *IEEE Trans. Energy Convers.* 21(2), 516 (2006); M. N. Marwali et al., *IEEE Trans. Energy Convers.* 22(3), 737 (2007); A. Riccobono and E. Santi, *IEEE Trans. Ind. Appl.* 50(5), 3525 (2014); and W. Inam et al., "Stability, control, and power flow in ad hoc dc microgrids," *Proc. IEEE Workshop Control Model. Power Electron.*, June 2016, pp. 1-8. The general approach is to treat the constant power system as a matched impedance problem and to use linear time-invariant small-signal methods to derive solutions to mitigate the instability. See C. Wildrick et al., *Trans. Power Electron.* 10, 280 (1995); and S. D. Sudhoff et al., *IEEE Trans. Aerosp. Electron. Syst.* 36(3), 965 (2000). However, the dynamics of a pulse power load can be so dramatic that linear small-signal methods are no longer valid. A pulse power load is a time-variant system and there are linear time-variant methods such as Floquet theory. See C. A. Klausmeier, *Theoretical Ecol.* 1(3), 153 (2008); D. Giaouris et al., *IEEE Trans. Circuits Syst. I, Reg. Papers* 55(4), 1084 (2008); and J. A. Martin et al., "Exact steady state analysis in power converters using Floquet decomposition," *Proc. North Amer. Power Symp.*, August 2011, pp. 1-7. However, while Floquet theory addresses the time-variant nature of the pulsed load, it still fails to capture the large-signal response. Yet other methods, such as in Sanchez and Marx, address the large-signal problem but are not adequate for a pulsed load. See S. Sanchez and M. Molinas, *IEEE Trans. Energy Convers.* 30(1), 122 (2015), and D. Marx et al., *IEEE Trans. Power Electron.* 27(4), 1773 (2012).

For DC systems with pulse power loads, the typical approach is to mitigate an instability by decoupling the load from the distribution network which requires large energy storage devices, such as flywheels, capacitors, or batteries. These energy storage devices add volume, weight, cost and reduced reliability. Most techniques used to analyze these systems are based on small-signal models, such as Nyquist, Eigenvalue or Floquet theory. However, a small-signal model is not appropriate for large pulsed power loads, and these small signal methods break down or yield inappropriate and inaccurate results. Typically, energy storage systems are used to mitigate instability of common loads based on a constant power approach. See A. Gattozzi et al., "Power system and energy storage models for laser integration on naval platforms," *Proc. IEEE Elect. Ship Technol. Symp.*, June 2015, pp. 173-180. However, the model of a load as constant power and not pulsed power may yield overly conservative designs and controls. See L. Domaschk et al., *IEEE Trans. Magn.* 43(1), 450 (2007). If the system design allows for a nonlinear limit cycle driven by a pulsed load then less energy storage may be necessary.

SUMMARY OF THE INVENTION

The present invention is directed to a large signal meta-stable analysis method based on a Hamiltonian surface shaping and power flow control (HSSPFC) methodology based on the average-mode model of DC-DC converters. The nonlinear time-variant load pulses create nonlinear limit cycles and dynamics. The stability of the limit cycles can be assessed through a comparison of the power generated versus power dissipated in the system. The power magnitude, duty cycle, and period of the pulsed load can then be adjusted to operate below the limit cycle, such that the energy generated during the cycle is equal to or less than the energy dissipated during the cycle. Simulation, hardware-in-the-loop, and hardware experimental results demonstrate the utility of the HSSPFC method.

BRIEF DESCRIPTION OF THE DRAWINGS

The detailed description will refer to the following drawings, wherein like elements are referred to by like numbers.

FIGS. 7A and 7F are graphs of the boost converter output voltage. FIGS. 7B and 7G are graphs of the load power pulse. FIGS. 7C and 7H are graphs of the generator and dissipator power flows. FIGS. 7D and 7I are graphs of the generator and dissipator energy. FIGS. 7E and 7J are graphs of the net stored energy.

FIG. 13A is a graph of the output voltage. FIG. 13 B is a graph of the inductor currents.

DETAILED DESCRIPTION OF THE INVENTION

The present invention is directed to a method to analyze and adjust pulsed power loads on a DC electric power distribution network, such as electric ships. The method formulates the shipboard power system and pulsed power loads as a Hamiltonian surface based on HSSPFC. See R. D. Robinett III and D. G. Wilson, *Nonlinear Power Flow Control Design: Utilizing Exergy, Entropy, Static and Dynamic Stability, and Lyapunov Analysis*, New York, N.Y., USA: Springer, 2011; and W. W. Weaver et al., *Control Eng. Practice* 44, 10 (2015). The Hamiltonian surface is a special type of Lyapunov function that can capture large-signal effects and accurately predict the stability boundaries of the system at a wide range of timescales. The pulsed power system may have an instability as defined by small-signal methods during the on period of a load in which the bus voltage grows exponentially. However, the off period of the pulsed load damps the instability and keeps the voltage bounded. This cycle of bound instability followed by a damping period is defined herein as meta-stable (similar to metastability in electronics, wherein a digital electronic system can persist for an unbounded time in an unstable equilibrium, albeit with exponentially deceasing probability over time). This method is not only appropriate for electric naval vessels, but also electric aircraft and other systems that are also being outfitted with pulsed power loads. See N. Doerry and J. Amy, "DC voltage interface standards for naval applications," *Proc. IEEE Elect. Ship Technol. Symp.*, June 2015, pp. 318-325; S. M. Iden et al., "Mw class power system integration in aircraft," *Proc. SAE Tech. Paper*, November 2004, Paper 2004-01-3202; B. C. Raczkowski et al., "Developing analysis for large displacement stability for aircraft electrical power systems," *Proc. SAE Tech. Paper*, September 2014, Paper 2014-01-2115; B. C. Raczkowski et al., "Large displacement stability by design for robust aircraft electric power systems," *Proc. SAE Tech. Paper*, October 2012, Paper 2012-01-2197; and M. Gries et al., *SAE Int. J. Aerosp.* 1, 894 (2008).

Figure 1:
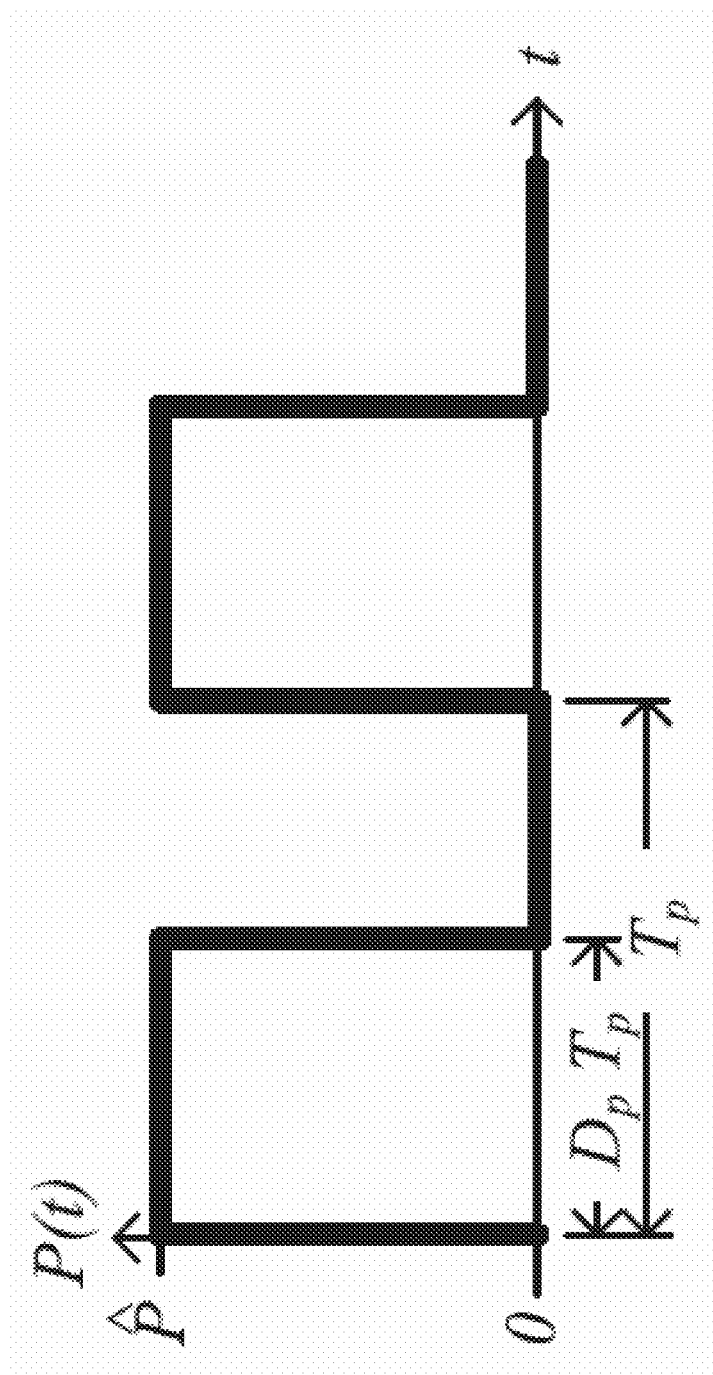
FIG. 1 is a diagram of a pulse width modulated, time dependent power waveform.

While a constant power load does have destabilizing effects, the stability of time-variant loads is less clear. An example of the type of time-variant load is a pulse width modulated (PWM) function shown in FIG. 1. The waveform of the load power has a period $T_p$, duty cycle $D_p$, and power magnitude $\hat{P}$. The pulsed load can cause nonlinear limit cycles in which the stability is not a straight forward analysis. See R. D. Robinett III and D. G. Wilson, *Nonlinear Power Flow Control Design: Utilizing Exergy, Entropy, Static and Dynamic Stability, and Lyapunov Analysis*, New York, N.Y., USA: Springer, 2011. However, in some cases where the duty cycle is high or the period is long the stability effects of the pulsed load will approach the constant power load such that $P(t) \approx \hat{P}$.

The description below reviews small-signal methods such as Eigenvalues and Nyquist. Then the linear time-variant Floquet method is described and shown to be inaccurate for the pulsed load. Lastly, the HSSPFC method of the present invention based on the average-mode model of DC-DC converters is described and demonstrated through simulation, hardware-in-the-loop, and experimental results. The results show that the HSSPFC method can accurately predict meta-stable performance with the identification of the corresponding stability boundaries.

Converter and Load Model

Figure 2:
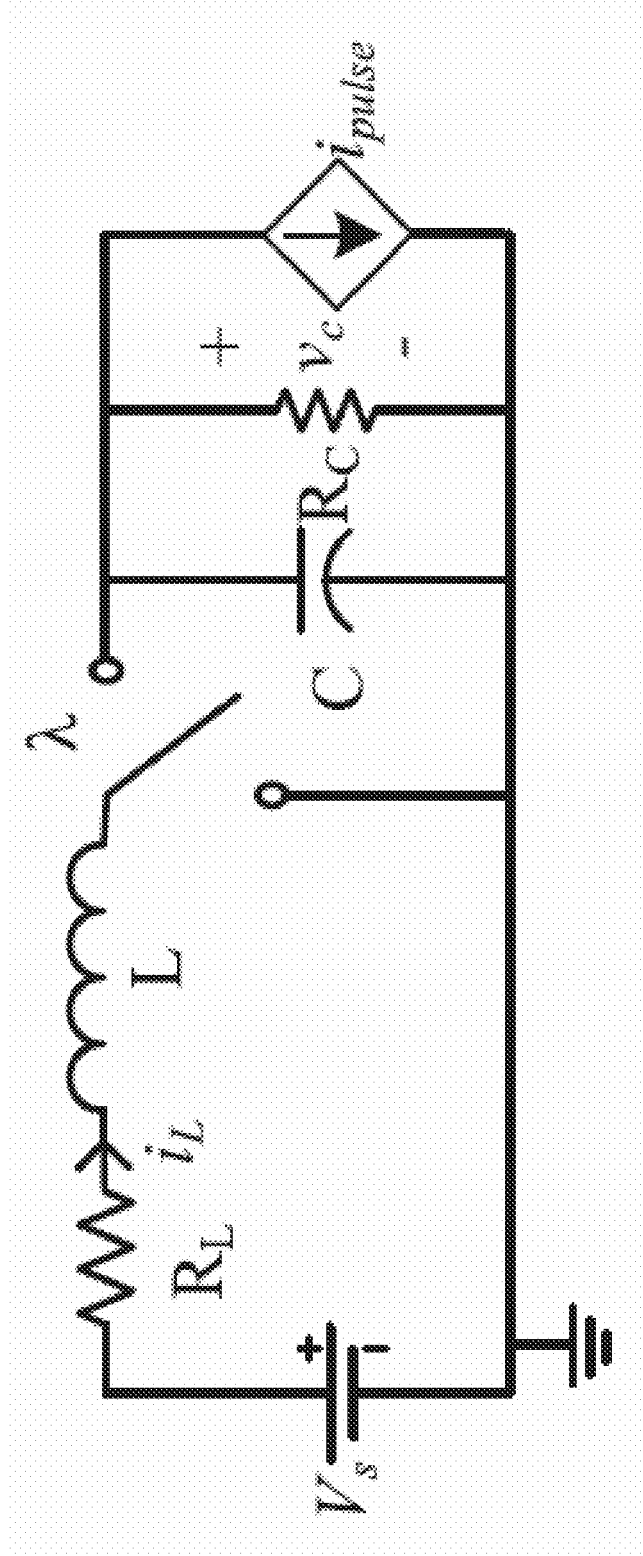
FIG. 2 is a diagram of an average-mode model of boost converter with pulsed current load.

Consider the boost converter model shown in FIG. 2. As an example, an average-mode model is considered where $\lambda=1-D$ of a switch mode model, where D is the duty cycle of the active switch. See P. Krein et al., *IEEE Trans. Power Electron.* 5(2), 182 (1990). For most pulsed power loads the average-mode model is sufficient since the time constant of the switch is much, much smaller than the time constant of the transient response or period of the power pulse. However, for cases where the pulsed load period approaches the switching frequency a different analysis is required. The average-mode model for the circuit shown in FIG. 2 has the form $$L\frac{di_L}{dt} = V_s - \lambda v_C - R_L i_L \tag{1}$$

$$C\frac{dv_C}{dt} = \lambda i_L - \frac{v_C}{R_C} - i_{load} \tag{2}$$

where $i_{load}$ represents the load. If the load is a constant power then the model is $$i_{load} = \frac{\bar{P}}{v_C} \tag{3}$$

which has been shown to have de-stabilizing characteristics and much research has been dedicated to mitigating this effect. See R. D. Middlebrook, "Input filter considerations in design and application of switching regulators," *Proc. IEEE Ind. Appl. Soc. Annu. Meeting*, 1976, pp. 366-382; W. W. Weaver and P. T. Krein, "Mitigation of power system collapse through active dynamic buffers," *Proc. IEEE Power Electron. Specialists Conf.*, 2004, vol. 2, pp. 1080-1084; A. Riccobono and E. Santi, *IEEE Trans. Ind. Appl.* 50(5), 3525 (2014); and S. D. Sudhoff et al., *IEEE Trans. Aerosp. Electron. Syst.* 36(3), 965 (2000). However, if the load is a pulse power, then the load model for the circuit shown in FIG. 2 is $$i_{load} = \frac{\bar{P}(t)}{v_C}. \tag{4}$$

Eigenvalue Small-Signal Stability Analysis

A simple and basic approach to studying the stability of a constant power load is through a small-signal Eigenvalue analysis. For the system model (1)-(2) and the constant power load (3), the linearized model is $$\frac{dx}{dt} = \begin{bmatrix} -\frac{R_L}{L} & -\frac{\lambda}{L} \\ \frac{\lambda}{C} & \frac{1}{C}\left(\frac{\bar{P}}{v_{co}^2} - \frac{1}{R_c}\right) \end{bmatrix} x + \begin{bmatrix} \frac{1}{L} \\ 0 \end{bmatrix} u \tag{5}$$

where $x^T = [i_L, v_C]$, $u = V_s$ and $v_{co}$ is the linearized operating point. The characteristic equation of (5) is $$s^2 + s\left(\frac{R_L}{L} + \frac{1}{CR_c} - \frac{\bar{P}}{Cv_{co}^2}\right) + \left(\frac{R_L}{CLR_c} + \frac{\lambda^2}{CL} - \frac{\bar{P}R_L}{CLv_{co}^2}\right) = 0 \tag{6}$$

which is only stable if $$\frac{R_L}{L} + \frac{1}{CR_c} - \frac{\bar{P}}{Cv_{co}^2} > 0 \tag{7}$$

$$\frac{R_L}{CLR_c} + \frac{\lambda^2}{CL} - \frac{\bar{P}R_L}{CLv_c^2} > 0 \text{ or} \tag{8}$$

$$\bar{P} < \frac{v_{co}^2}{R_c} + R_L v_{co}^2 \frac{C}{L} \text{ and} \tag{9}$$

$$\bar{P} < \frac{v_{co}^2}{R_c} + \frac{v_{co}^2 \lambda^2}{R_L}. \tag{10}$$

Since $R_L \ll R_C$, the power constraint in (9) will be much less then (10). Therefore, the limiting power constraint is taken as (9). It should be noted that this analysis is only valid for a time invariant system (3), and is only accurate for a small region around the linearized operating point $v_{co}$. Furthermore, this analysis may yield an overly conservative estimation of the large-signal stability. A small-signal Eigenvalue analysis may show that the load is unstable, yet if the load is pulsed it may yield stable limit cycles.

Nyquist Stability Criteria

An alternative approach for a small-signal stability analysis is through the frequency-domain Nyquist criteria. For this method, the model is split between the impedance of the load and output admittance of the converter. For this system, the transfer function is based on (1)-(2), where $v_o$ is the output and $i_{load}$ is the input and is given as $$G_{boost}(s) = \frac{R_c(R_L + Ls)}{s^2 CLR_c + s(CR_c R_L + L) + \lambda^2 R_c + R_L}. \tag{11}$$

The linearized gain of the constant power load from (3) is $$K(s) = -\frac{\bar{P}}{v_{co}^2}. \tag{12}$$

Figure 3:
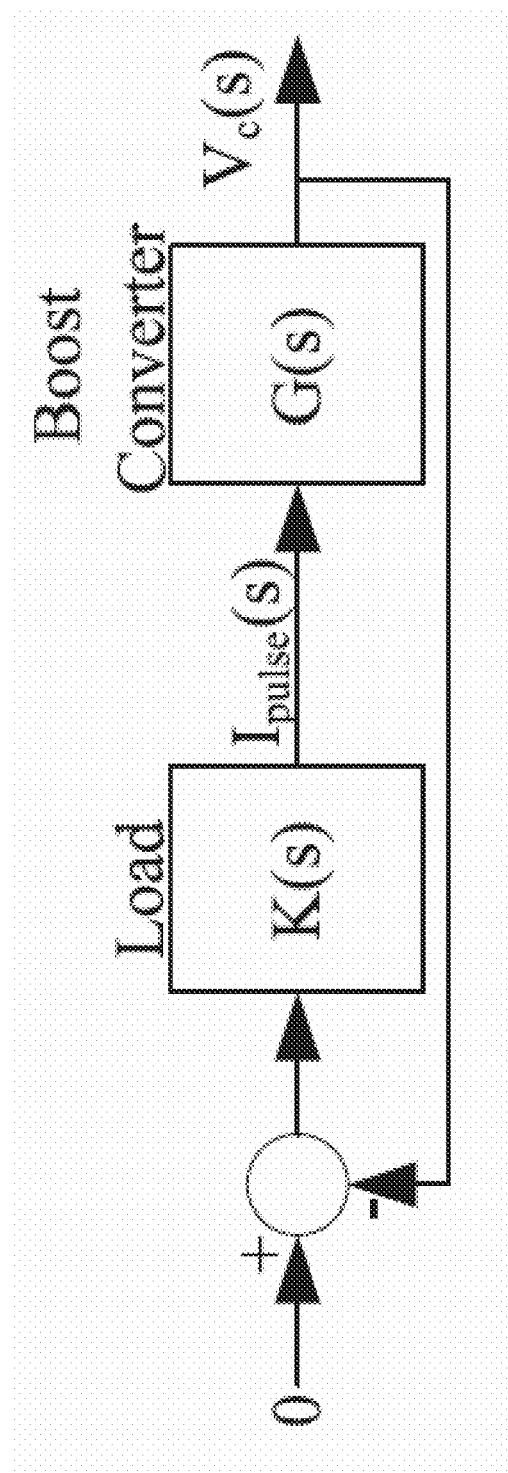
FIG. 3 is a feed-back block diagram of boost converter and load.

The feedback gain of the system, as shown in FIG. 3, is $$\frac{G(s)K(s)}{1 + G(s)K(s)} \tag{13}$$

where the loop gain is $$G(s)K(s) = \frac{-L\bar{P}_s R_c - \bar{P} R_c R_L}{s^2 CLR_c v_{co}^2 + s v_{co}^2 (CR_c R_L + L) + v_{co}^2 (\lambda^2 R_c + R_L)}. \tag{14}$$

Figure 4:
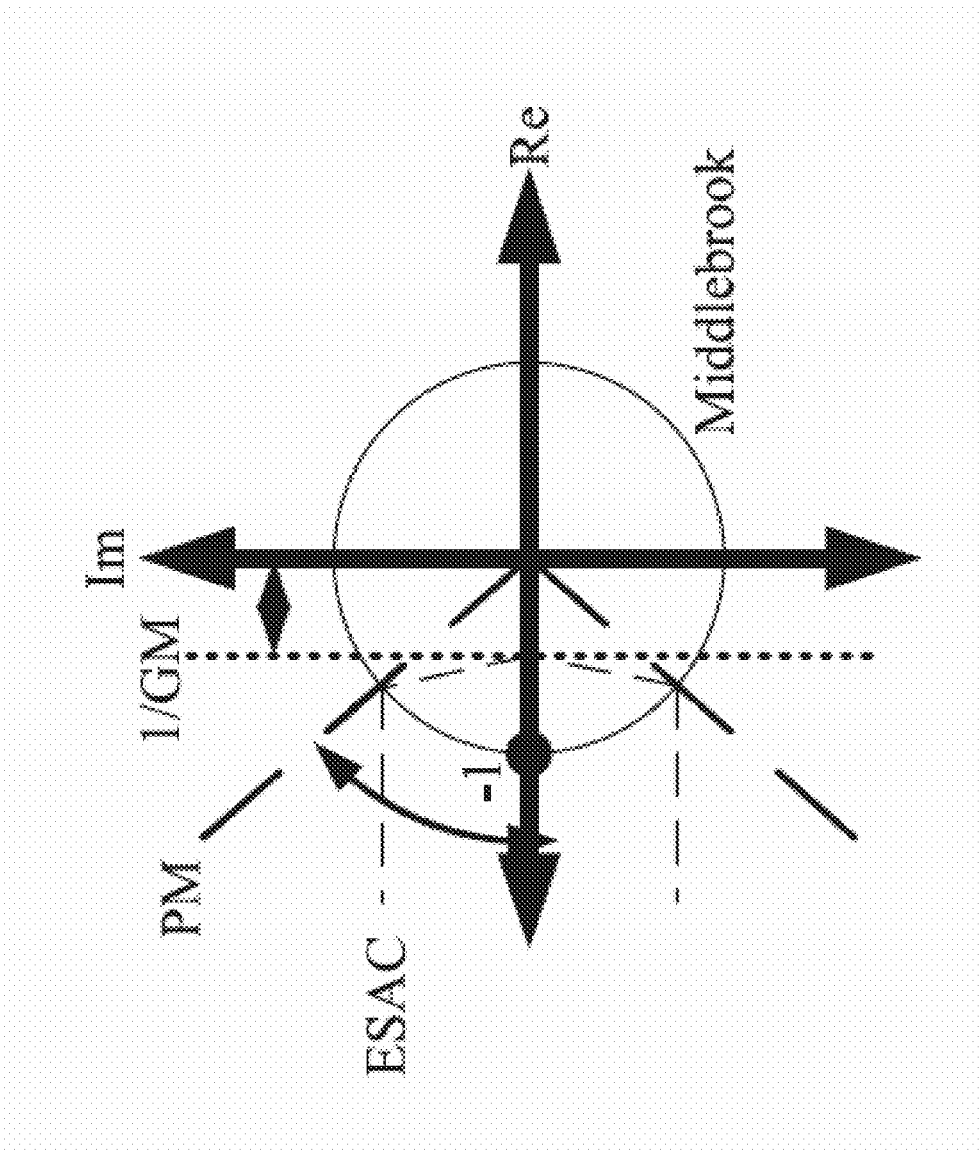
FIG. 4 is a diagram of Nyquist plane stability criteria for feedback loop gain, including Middlebrook criteria, gain margin (GM), phase margin (PM), and Energy Systems Analysis Consortium (ESAC).

From the feedback gain (13) it can be seen that the loop gain (14) cannot have any encirclements of −1 on the complex plane of (14). This stability concept has been adapted into several criteria shown in FIG. 4, including standard gain margin (GM) and phase margin (PM) as well as Middlebrook and the Energy Systems Analysis Consortium (ESAC) criteria. See R. D. Middlebrook, "Input filter considerations in design and application of switching regulators," *Proc.*

*IEEE Ind. Appl. Soc. Annu. Meeting,* 1976, pp. 366-382; C. Wildrick et al., *Trans. Power Electron.* 10, 280 (1995); and S. D. Sudhoff et al., *IEEE Trans. Aerosp. Electron. Syst.* 36(3), 965 (2000). While Middlebrook is the most conservative (|GK|<1) and ESAC is the most open, all the methods are still small-signal, only valid around a small operating range about $v_{co}$ and invalid for a time-variant pulsed load.

Floquet Stability Analysis of Time Linear Periodic System

One approach to analyze the stability of a periodic time varying load is through Floquet theory. See C. A. Klausmeier, *Theoretical Ecol.* 1(3), 153 (2008). Floquet theory characterizes the periodic orbits of a time-variant linear system and finds the analogous of Eigenvalues of how the orbits are evolving.

For a linear time-varying system $$\frac{dx}{dt} = A(t)x \quad (15)$$

the general solution is $$x = \sum_{i=1}^{n} c_i e^{\mu_i t} p_i(t) \quad (16)$$

where $c_i$ are constants depending on initial conditions, pi(t) are vector-valued functions with period T, and μi are the Floquet exponents, which are analogous to the Eigenvalues. Floquet multipliers are related to the Floquet exponents by $$\rho_i = e^{\mu_i T}. \quad (17)$$

The long-term behavior of the system is determined by the Floquet exponents. The zero equilibrium is stable if all of the Floquet exponents have negative real parts, or equivalently the Floquet multipliers have real parts between −1 and 1. The Floquet exponents and multipliers are found from $$\frac{dZ}{dt} = A(t)Z \quad (18)$$

where Z is an n×n matrix and the initial condition is the identity matrix (Z(0)=I). Where the Floquet multipliers $\rho_i$ are the Eigenvalues of Z(T). The solution of Z must typically be solved numerically.

Figure 5:
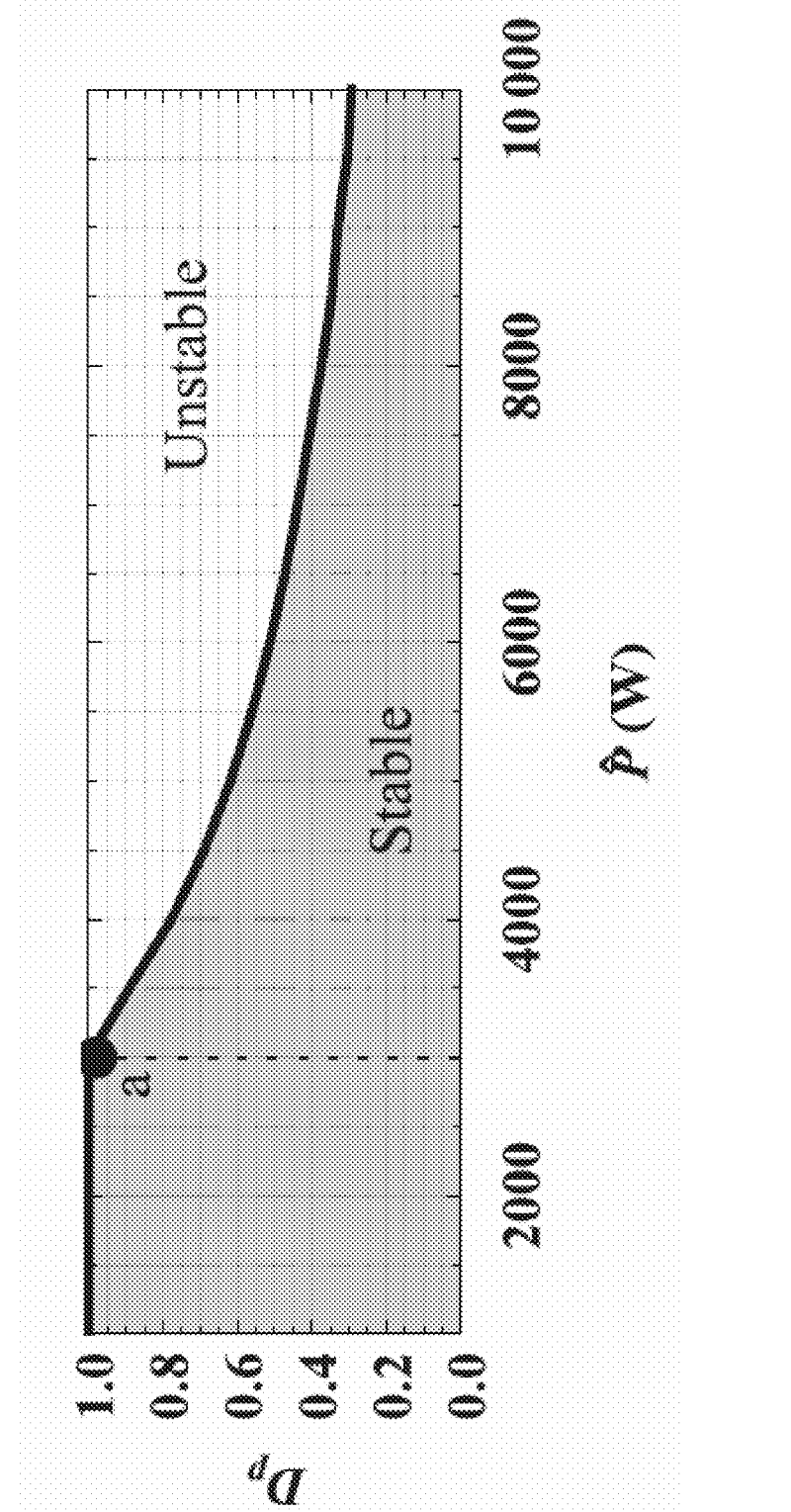
FIG. 5 is a stability limit map of pulsed load based on Floquet stability at $T_p=0.5$ s.

This approach enables the analysis of the linearized system model (1) and (2) with the pulsed power load (4) which becomes $$\frac{dx}{dt} = \begin{bmatrix} -\frac{R_L}{L} & -\frac{\lambda}{L} \\ \frac{\lambda}{C} & \frac{1}{C}\left(\frac{P(t)}{v_{co}^2} - \frac{1}{R_c}\right) \end{bmatrix} x \quad (19)$$

where $x^T = [v_C]$ and $v_{co}$ is the equilibrium bus voltage. The stability of this system was numerically solved with Floquet theory with the parameters shown in Table I and the periodic PWM pulsed load shown in FIG. 1. The system was first swept over a range of power magnitudes P̂ from 500 W to 10000 W to find the maximum stable duty cycle $D_p$ at a period of $T_p = 0.5$ s. The results are shown in FIG. 5. It is important to point out that at low power magnitudes the maximum duty cycle is 1 which represents a constant power. This validates that any pulse width is stable up to a constant power predicted by small-signal time invariant methods. For the parameters in Table I the maximum constant power according to (9) is 3360 W, which corresponds to point a in FIG. 5. Any pulsed load up to constant power to the left of point a in FIG. 5 will be stable. However, only points in the gray area to the right of point a in FIG. 5 will be meta-stable.

TABLE 1

EXAMPLE PARAMETERS

| Parameter | Value |
|---|---|
| $R_L$ | 0.1 Ω |
| L | 10 mH |
| C | 100 μF |
| $R_C$ | 50 Ω |
| λ | 0.5 |
| $v_{co}$ | 400 V |

Figure 6:
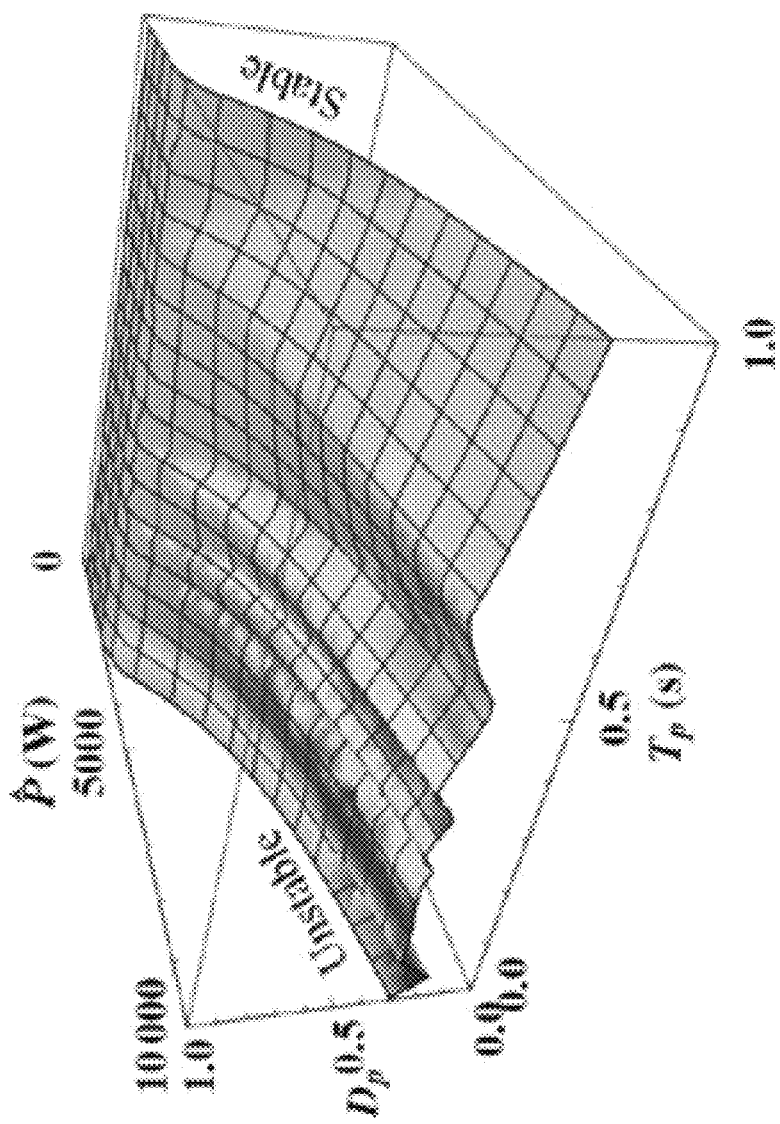
FIG. 6 is a stability limit map of pulsed load based on Floquet stability.
Figure 7A:
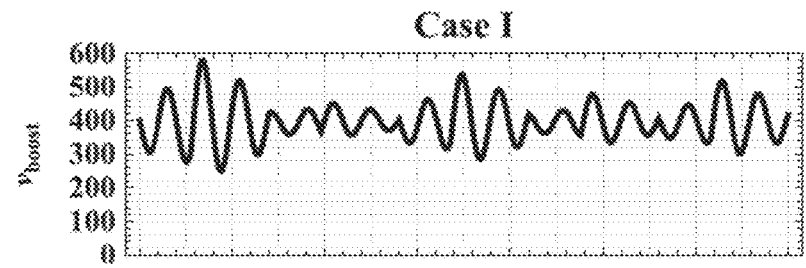
FIGS. 7A-7J are graphs of examples of two simulation cases demonstrating the HSSPFC stability limits approach. Case I (FIGS. 7A-7E): $\hat{P}=5000$ W, $T_p=0.14$ s, $D_p=0.4$. Case II (FIGS. 7F-7J): $\hat{P}=5000$ W, $T_p=0.12$ s, $D_p=0.4$.
Figure 7B:
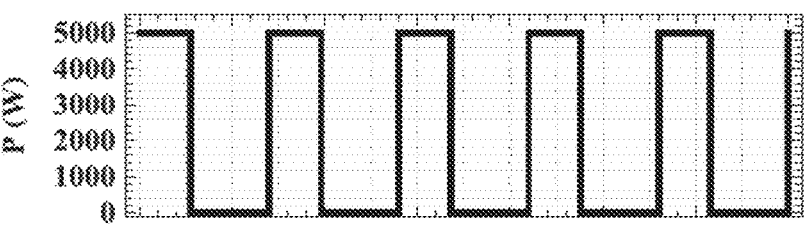
Figure 7C:
Figure 7D:
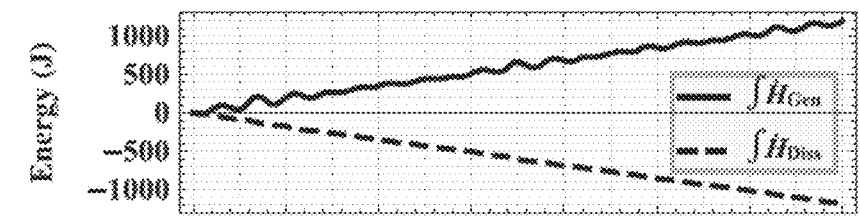
Figure 7E:
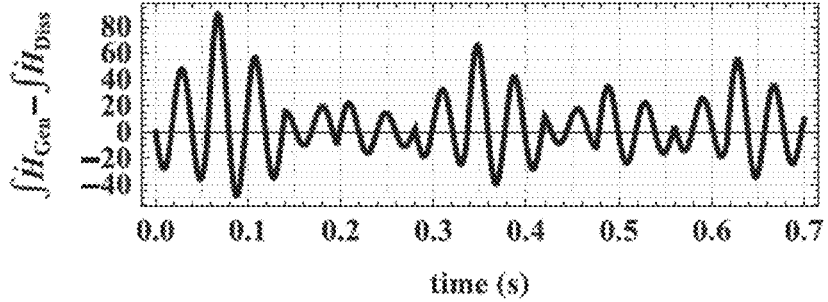
Figure 7F:
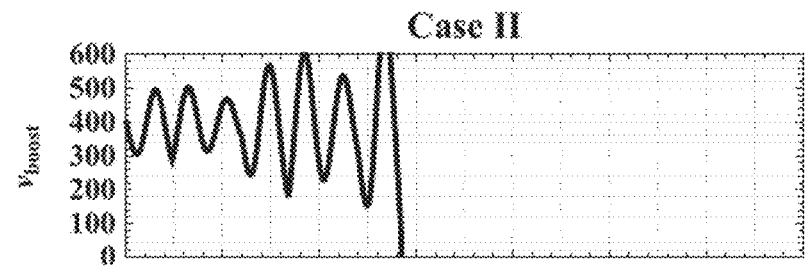
Figure 7G:
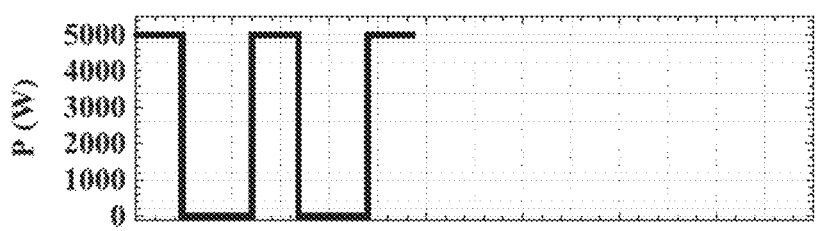
Figure 7H:
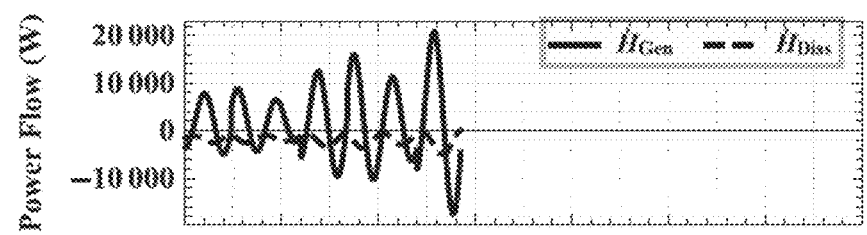
Figure 7I:
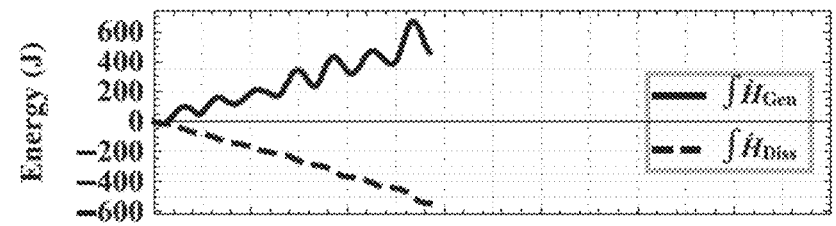
Figure 7J:
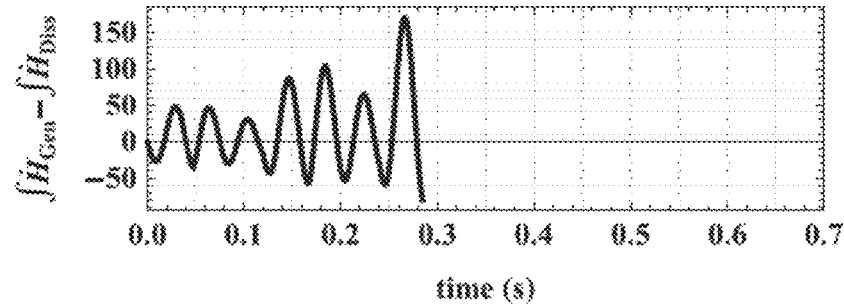

A full map of the maximum duty cycles with the parameters in Table I over the pulsed load duty cycle $D_p$ and period $T_p$ is shown in FIG. 6. The maximum stable pulsed load duty cycle in FIG. 6 was found by numerically solving the Floquet multipliers over a range of power levels and pulse periods. It should be noted that the maximum duty cycle diminishes as the power magnitude increases, but also that some nonlinear effects at the period increases as seen as the ripples on the $T_p$ axes in FIG. 6. These nonlinear effects are a result of the limit cycles in the linear system (19) and the nonlinear power pulse waveform.

Floquet theory is an effective tool to determine the stability of a linear periodic time-variant system. However, because it is essentially a linear small-signal method, it is only accurate around a small operating point and may give erroneous results with larger transient responses. Therefore, an accurate tool to characterize the stability or meta-stability of a pulsed power load needs to be a large-signal method.

Hamiltonian Surface Shaping Power Flow Control (HSSPFC)

Fundamentally, the necessary and sufficient conditions for the stability of a Hamiltonian natural linear or nonlinear system can be determined from the shape of the Hamiltonian surface and its power flow or time derivative. This is true for both small-signal and large-signal response. The proof of this observation can be found in Robinett and Wilson. See R. D. Robinett III and D. G. Wilson, *Nonlinear Power Flow Control Design: Utilizing Exergy, Entropy, Static and Dynamic Stability, and Lyapunov Analysis,* New York, N.Y., USA: Springer, 2011. The Hamiltonian is the stored energy (or exergy) of the system and is given as the sum of the kinetic, $\mathcal{T}$, and potential energies, $\mathcal{V}$. For the circuit shown in FIG. 2, this becomes $$\mathcal{H} = \mathcal{T} + \mathcal{V} = \tfrac{1}{2} L i_L^2 + \tfrac{1}{2} C v_C^2 \quad (20)$$

and is a positive definite function. The time derivative of the Hamiltonian is the power flow or work-rate principle $$\dot{\mathcal{H}} = i_L L \frac{di_L}{dt} + v_C C \frac{dv_C}{dt} \quad (21)$$

$$= i_L(V_s - i_L R_L - \lambda v_C) + v_C\left(\lambda i_L - \frac{v_C}{R_c} - i_{pulse}\right)$$

$$= V_s i_L - i_L^2 R_L - v_C\left(\frac{P(t)}{v_C} + \frac{v_C}{R_c}\right)$$

$$= V_s i_L - P(t) - \frac{v_C^2}{R_c} - i_L^2 R_L.$$

To determine the dynamic stability boundary the power flow is evaluated around the nonlinear limit cycle which is defined as $$H_{cyclic} = \oint_T \dot{H} dt \qquad (22)$$

$$= \oint_T \dot{H}_{Gen} dt - \oint_T \dot{H}_{Diss} dt$$

$$= \oint_T \left(V_s i_L - P(t) - \frac{v_C^2}{R_c} - i_L^2 R_L\right) dt$$

$$= 0$$

where $\tau$ is the period of the limit cycle, which is not necessarily the period of the pulsed load $T_p$. A nonlinear limit cycle occurs when the generator terms are equal to the dissipator terms $$\oint_\tau \dot{\mathcal{H}}_{Gen} dt = \oint_\tau \dot{\mathcal{H}}_{Diss} dt \qquad (23)$$

or $$\oint_T (V_s i_L - P(t)) dt = \oint_T \left(\frac{v_C^2}{R_c} + i_L^2 R_L\right) dt \qquad (24)$$

where the power generators for this system are defined as $$\dot{\mathcal{H}}_{Gen} = V_s i_L - P(t) \qquad (25)$$

and the power dissipators are defined as $$\dot{H}_{Diss} = \frac{v_C^2}{R_c} + i_L^2 R_L. \qquad (26)$$

There are three conditions that result from the limit cycle analysis. The first condition is when the system is in equilibrium and is defined as in (23). The second condition is when more energy is generated in the cycle then dissipated and the system will grow unbounded and become unstable or and the third condition is when more energy is dissipated during the cycle then generated and the system orbit decays and is stable or $$\oint_{\tau_T} \dot{\mathcal{H}}_{Gen} dt < \oint_{\tau_T} \dot{\mathcal{H}}_{Diss} dt. \qquad (28)$$

The goal is to determine large-signal stable limit cycles defined by (23) and recognize when the system may become unstable defined by (27). For cyclic inputs, such as the pulsed loads, these conditions are of most interest.

Since a closed form solution of the pulsed power model cannot typically be found, then a closed form solution for (23) also cannot be found and must be solved numerically. The example system of the model (1) and (2) with the load (4) and the HSSPFC analysis (23)-(27) was built and tested in Wolfram Mathematica and System Modeler with the parameters given in Table I. See Wolfram Research, Inc., "Mathematica." [Online]. Available: https://www.wolfram.com/. Accessed on: Jan. 24, 2017; and Wolfram Research, Inc., "System modeler." [Online]. Available: https://www.wolfram.com/. Accessed on: Jan. 24, 2017. Two scenarios for the pulsed load are simulated to demonstrate this approach. In Case I, the pulsed load is $\hat{P}$=5000 W, $T_p$=0.14 s, $D_p$=0.4, and in Case II, $\hat{P}$=5000 W, $T_p$=0.12 s, $D_p$=0.4. The results of these two test cases are shown in FIGS. 7A-7J. Case I results are shown in FIGS. 7A-7E and Case II results are shown in FIGS. 7F-7J. In Case I the net energy, shown in FIG. 7E, meets the first condition as in (23) and remains bounded and the system is stable. However, in Case II the net energy, FIG. 7J, results in the second condition or (27) and grows until the system becomes unstable and the simulation terminates. It is most important to note that the small difference in pulse period can cause a very undesirable effect. Also note in FIGS. 7A and 7C that the nonlinear limit cycle is not necessarily at the same period as the pulsed load.

Figure 8:
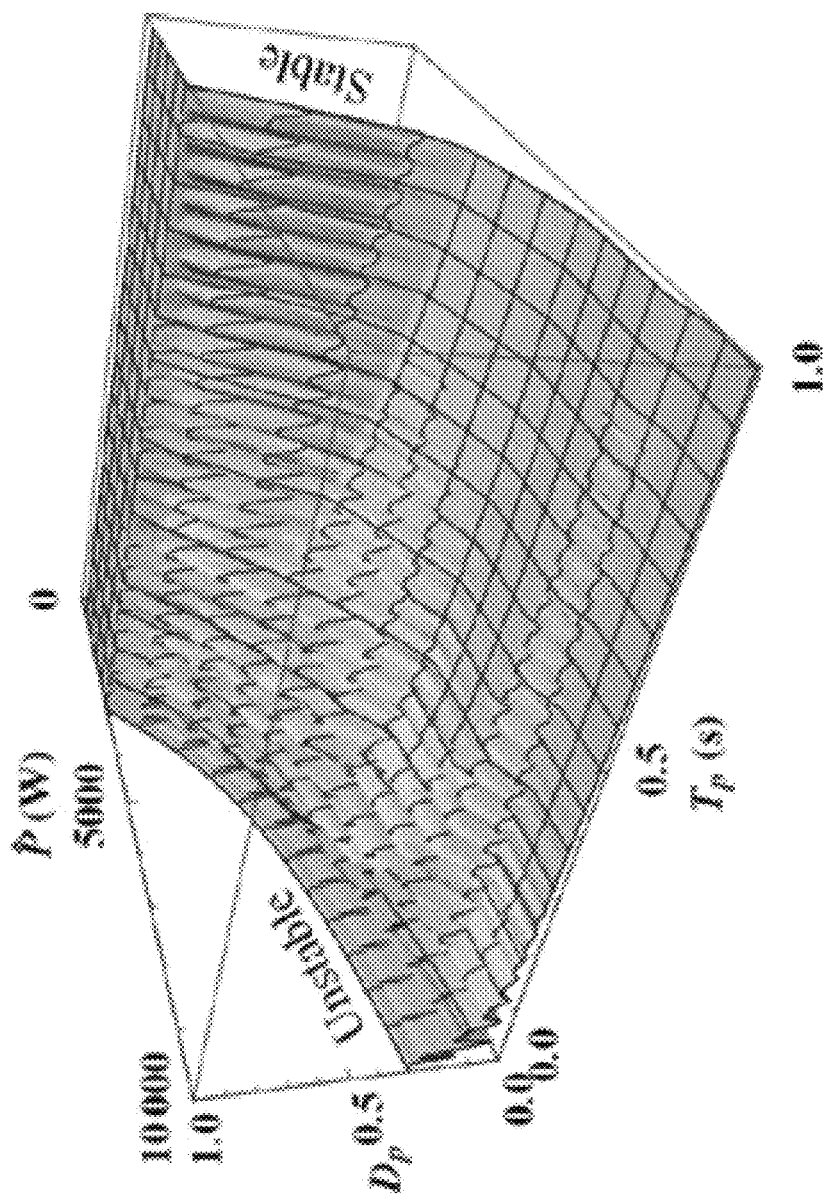
FIG. 8 is a stability limit map of pulsed load based on HSSPFC stability approach.
Figure 9:
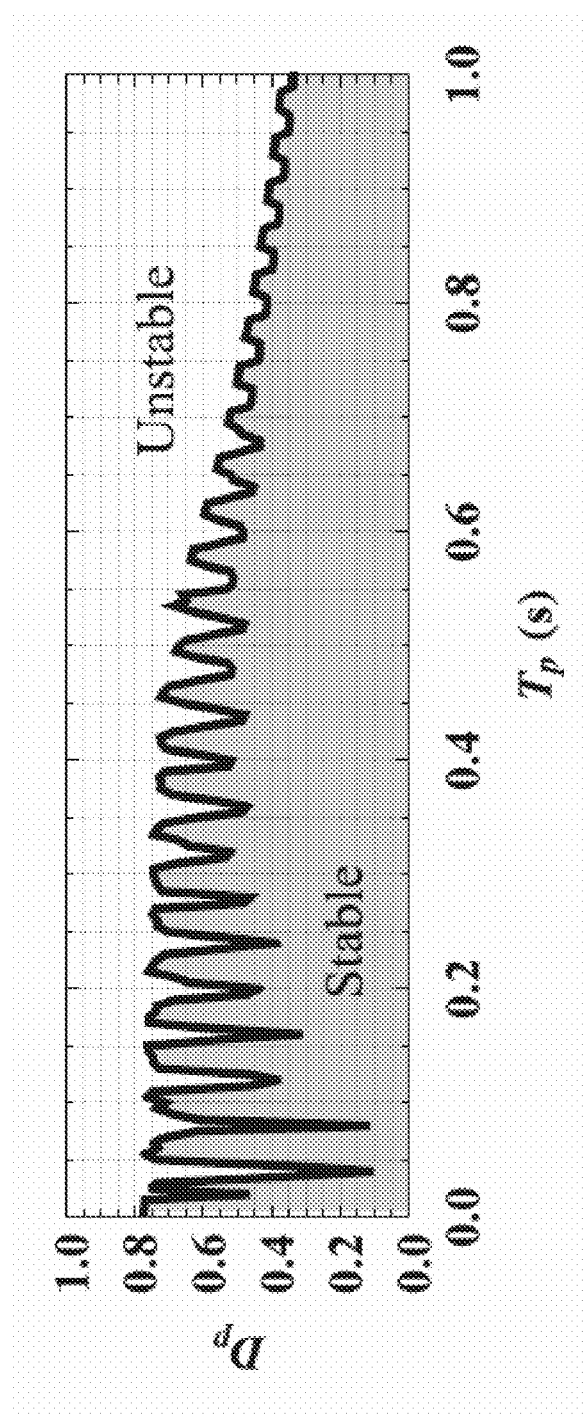
FIG. 9 is a graph of HSSPFC stability margin at $\hat{P}=5000$ W.

This HSSPFC approach was then used to map out the stability boundaries on the pulsed load parameters with the results shown in FIG. 8. Notice that FIGS. 8 and 6 have the same trends in decreasing stable duty cycle as well as the same region of stability for low power magnitudes. However, FIG. 8 reveals a lot more detail in the nonlinear results. To better illustrate the small parameter variation ripples, a slice of FIG. 8 at $\hat{P}$=5000 W is shown in FIG. 9 where the stability boundary is not smooth. This ripple in the stability boundary can be critical in system design.

Figure 10:
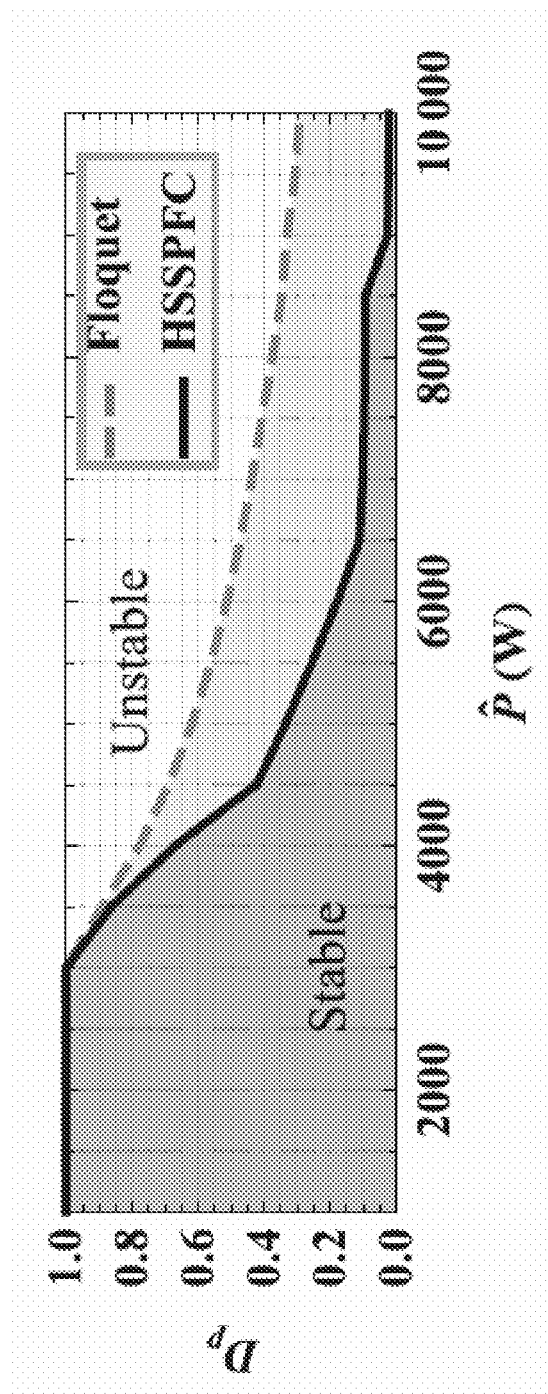
FIG. 10 is a graph of comparison of Floquet and HSSPFC stability limits at $T_p=0.5$ S.

The stability boundaries provided by the HSSPFC approach is compared to the Floquet in FIG. 10 at a load period of $T_p$=0.5 s. In FIG. 10 it is seen that the Floquet method falsely predicts a higher stable load duty cycle. This is because Floquet is still essentially a small-signal method applied to a large-signal problem and is inadequate to produce accurate results. The HSSPFC approach is more accurate because it does not use any simplifying approximations for the system dynamics and uses all system energy flows to determine stability. The HSSPFC stability boundary represents a no-energy storage solution for a DC microgrid. The stability boundary therefore defines a starting baseline from which energy storage can be added to provide a desired margin of safety.

Hardware-in-the-Loop Experimental Results

Figure 11:
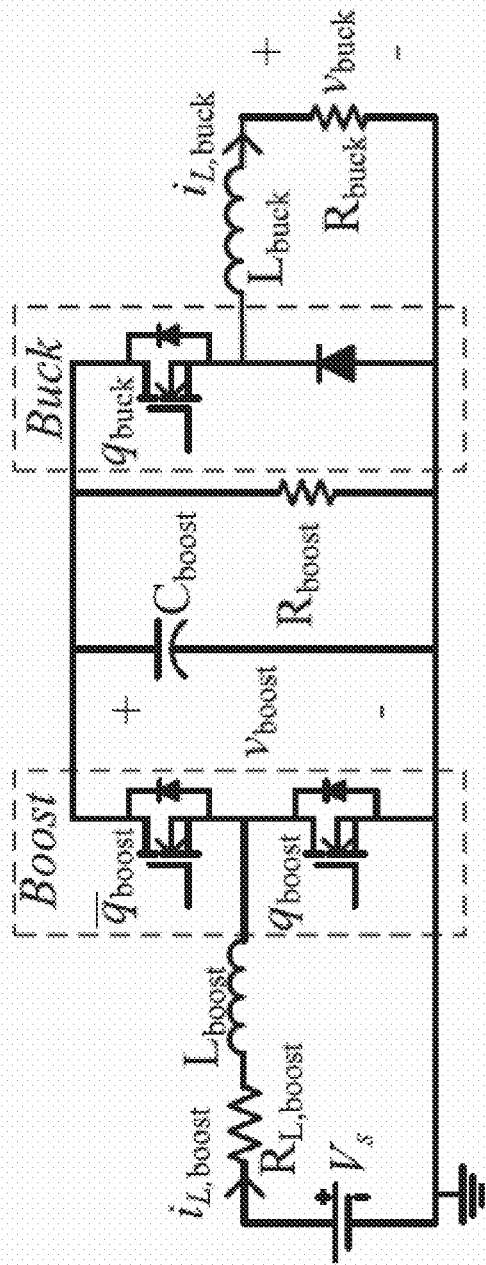
FIG. 11 is a diagram of a circuit under HIL test, showing a cascade of voltage source, boost converter, then buck converter.

To validate and demonstrate the HSSPFC stability approach, the system shown in FIG. 11, with parameters given in Table II, was built and tested in the ultra-low latency Typhoon Hardware-in-the-Loop (HIL) 602 Platform. See D. Majstorovic et al., *IEEE Trans. Ind. Electron.* 58(10), 4708 (2011). The circuit in FIG. 11 consists of a boost converter cascaded with a RC passive load, followed by an active power electronics buck converter. To implement the constant power load, the buck converter is controlled through a sliding-mode/hysteresis control shown in FIG. 12 and implemented in Field-Programmable Gate Array (FPGA) hardware. See H. Sira-Ramirez and M. Ilic, *IEEE Trans. Circuits Syst.* 35(10), 1291 (1988). The control surface is defined as $$s = v_{buck,ref} - v_{buck}. \qquad (29)$$

This approach tightly regulates the voltage on the output resistor $R_{buck}$ and effectively implements a constant power characteristic at the input to the buck converter. The magnitude of the pulse voltage reference can then be calculated based on the desired power magnitude such that $$\dot{v}_{buck,ref} = \sqrt{PR_{buck}}. \quad (30)$$

Figure 12:
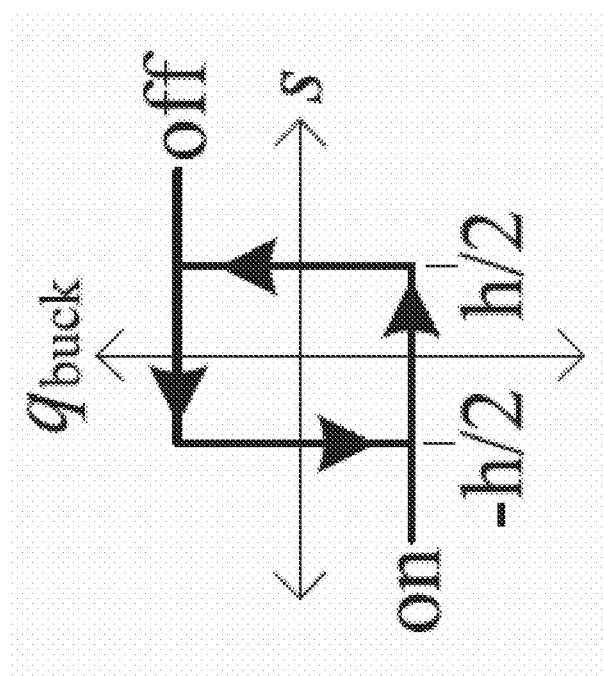
FIG. 12 is a diagram of hysteresis controller of buck output voltage.

The hysteresis bound h, shown in FIG. 12, is to prevent excessive chatter or, put another way, to limit the effective switching frequency of the sliding mode control scheme. For the HIL experiments the value of the hysteresis band was set to h=1 V. To implement a power pulse with a magnitude of 5000 W, the buck reference voltage was set to 158 V according to (30). Therefore, the ripple on the output of the buck converter will be 6% with no overshoot when the pulsed load turns on.

Figures 13A, 13B:
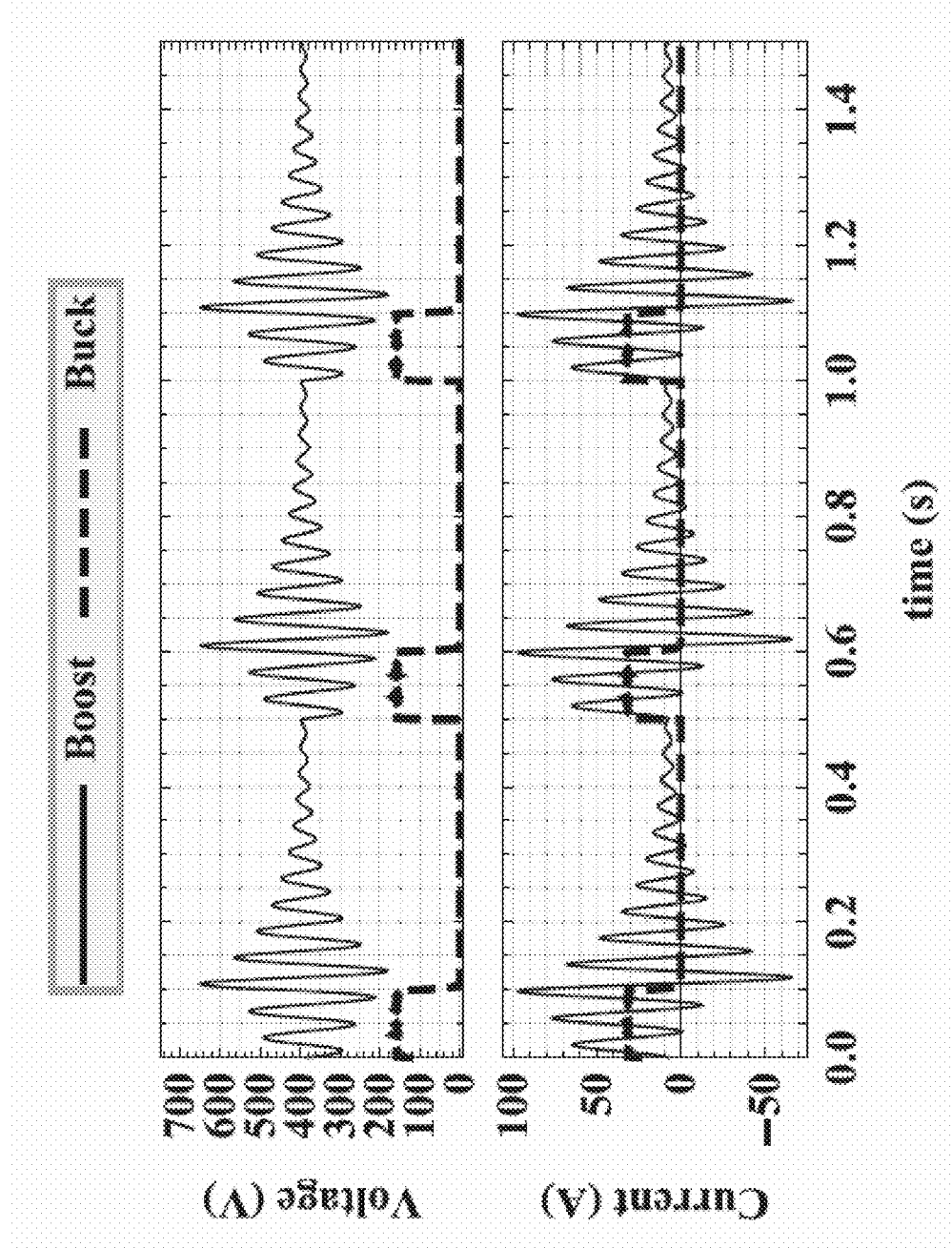
FIGS. 13A and 13B are graphs of HIL experiment boost and buck results for pulse load of $T_p=0.5$ s, $D_p=0.2$, $V_{buck,ref}=158$ V ($\hat{P}=5000$ W).

The HIL circuit was run with a pulsed load of $T_p$=0.5 s, $D_p$=0.2, $v_{buck,ref}$=158 V ($\hat{P}$=5000 W), with the output voltages and inductor currents of both converters shown in FIGS. 13A and 13B, respectively. As predicted in FIG. 8, this operating point ($T_p$=0.5 s, $D_p$=0.2) is stable (or meta-stable). When the pulsed load turns on at t=0 s, t=0.5 s, and t=1.0 s in FIG. 13 than the envelope of the boost output voltage grows exponentially until the pulsed load power is turned off, at which time the voltage oscillations decay and the system remains bounded or meta-stable.

Figure 14:
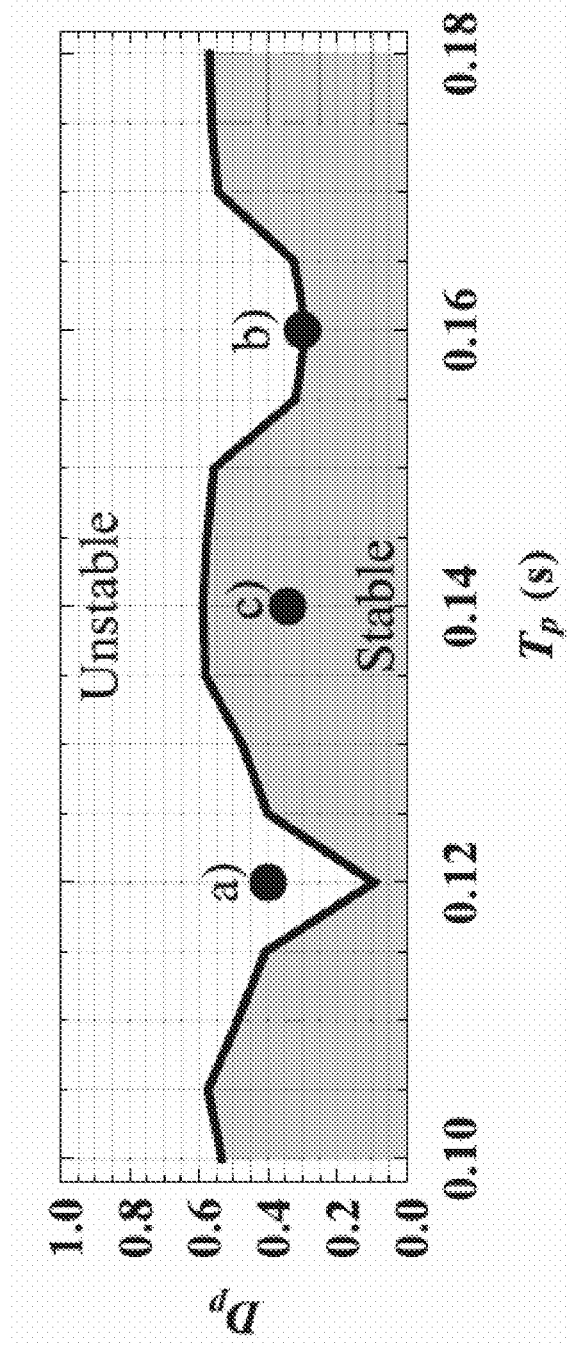
FIG. 14 is a graph of zoomed in area of FIG. 9 at $\hat{P}=5000$ W for demonstration of case (a) $T_p=0.12$ s, $D_p=0.40$ (unstable), case (b) $T_p=0.16$ s, $D_p=0.30$ (marginally meta-stable), and case c) $T_p=0.14$ s, $D_p=0.34$ (meta-stable).
Figures 15A, 15B, 15C:
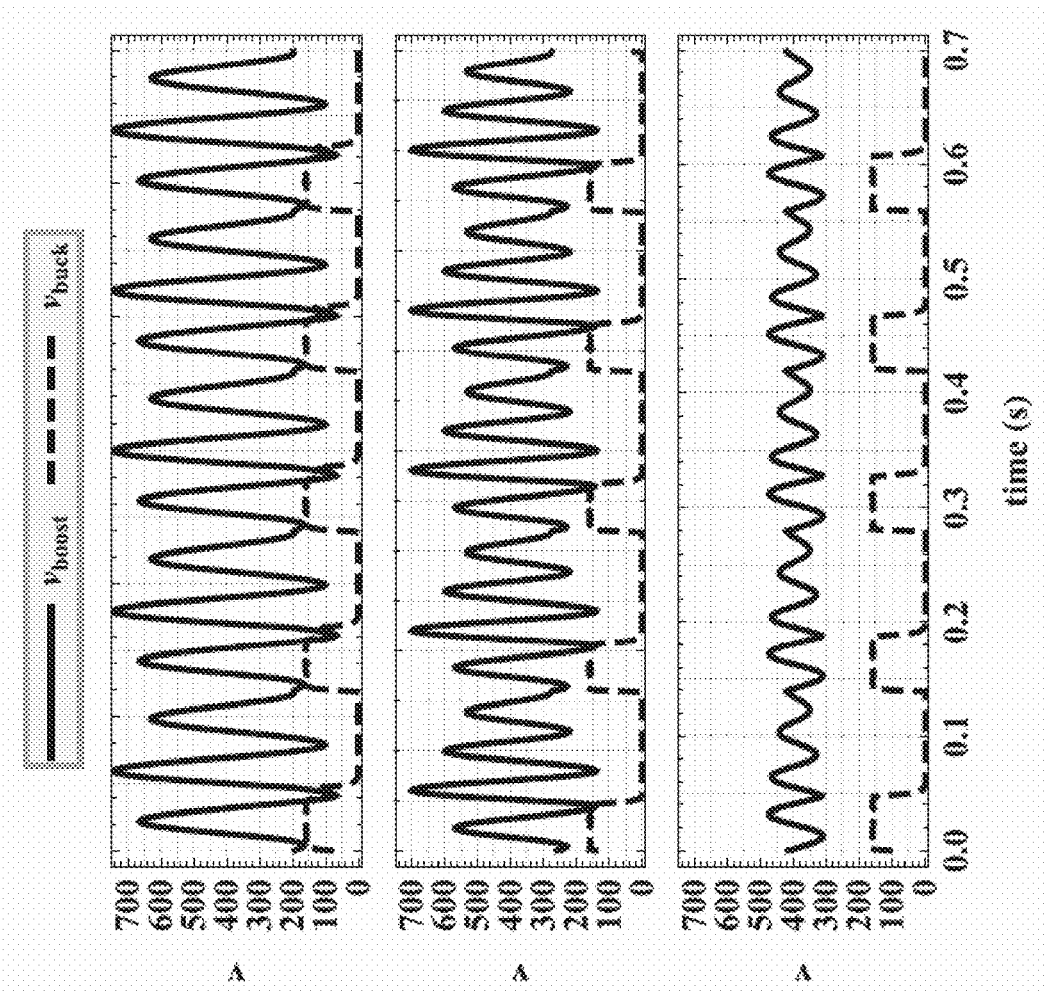
FIGS. 15A-15C are graphs of HIL experiment boost and buck output voltage results of cases (a) $T_p=0.12$ s, $D_p=0.40$, $V_{buck,ref}=158$ V (unstable), case (b) $T_p=0.16$ s, $D_p=0.30$ (marginally meta-stable), and case (c) $T_p=0.14$ s, $D_p=0.34$ (meta-stable), respectively.

The circuit was then run in the HIL platform for three operating points predicted closer to the stability margin by the HSSPFC method. The zoomed-in area from FIG. 9 is shown in FIG. 14 with three test case points. The pulsed power load buck converter was implemented through (30). Case a) predicts instability, case b) is marginally meta-stable and case c) is meta-stable. The results of the three test cases run in the HIL are shown in FIGS. 15A-15C. In the HIL circuit of FIG. 11 the boost converter output voltage $v_{boost}$ must always be greater than $v_{buck}$. If, at any point $v_{boost} \leq v_{buck}$ then the buck load simply becomes $R_{buck}L_{buck}$. Therefore, for the purposes of the HIL validation, the stability point is defined as $$v_{boost} > v_{buck} \forall t. \quad (31)$$

However, some hardware or applications may have equipment limitations that would constrain the voltage extremes even further. As predicted by FIG. 14, the boost voltage in FIG. 15A shows the average boost voltage is 400 $V_{dc}$ as desired, but the voltage swing magnitude violates the stability bounds. FIG. 15B shows the boost voltage limit just at the limit of the buck voltage. FIG. 15C is a meta-stable operation. It is again important to point out the large change in response with a small change in the pulsed load period. Each one of the cases shown in FIGS. 14 and 15A-15C have the same pulse width $D_pT_p$ and would deliver the same amount of energy to the load per pulse. However, by adjusting the period of the pulse, different stability results emerge. If this example were a pulsed load weapon on an electric ship, such as a laser, then a system designer could adjust parameters to ensure a meta-stable operating condition such as point c) in FIG. 14 and not point a).

Hardware Experimental Results

Figure 16:
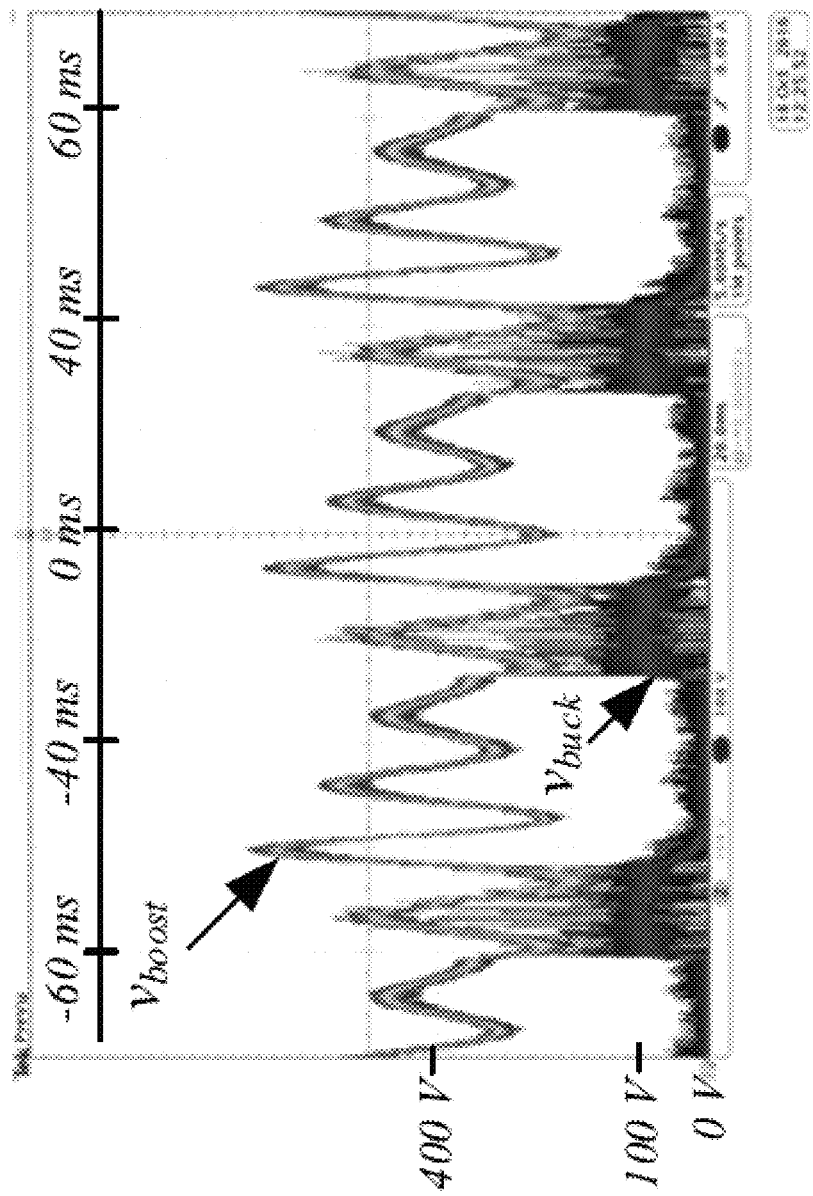
FIG. 16 is a graph of hardware experiment results with $T_p=0.54$ s, $D_p=0.33$ sec, $V_{buck,ref}=100$ V and demonstrates large variations in the boost voltage. Oscilloscope horizontal scale is 20 ms/division and the vertical scale is 100V/division.
Figure 17:
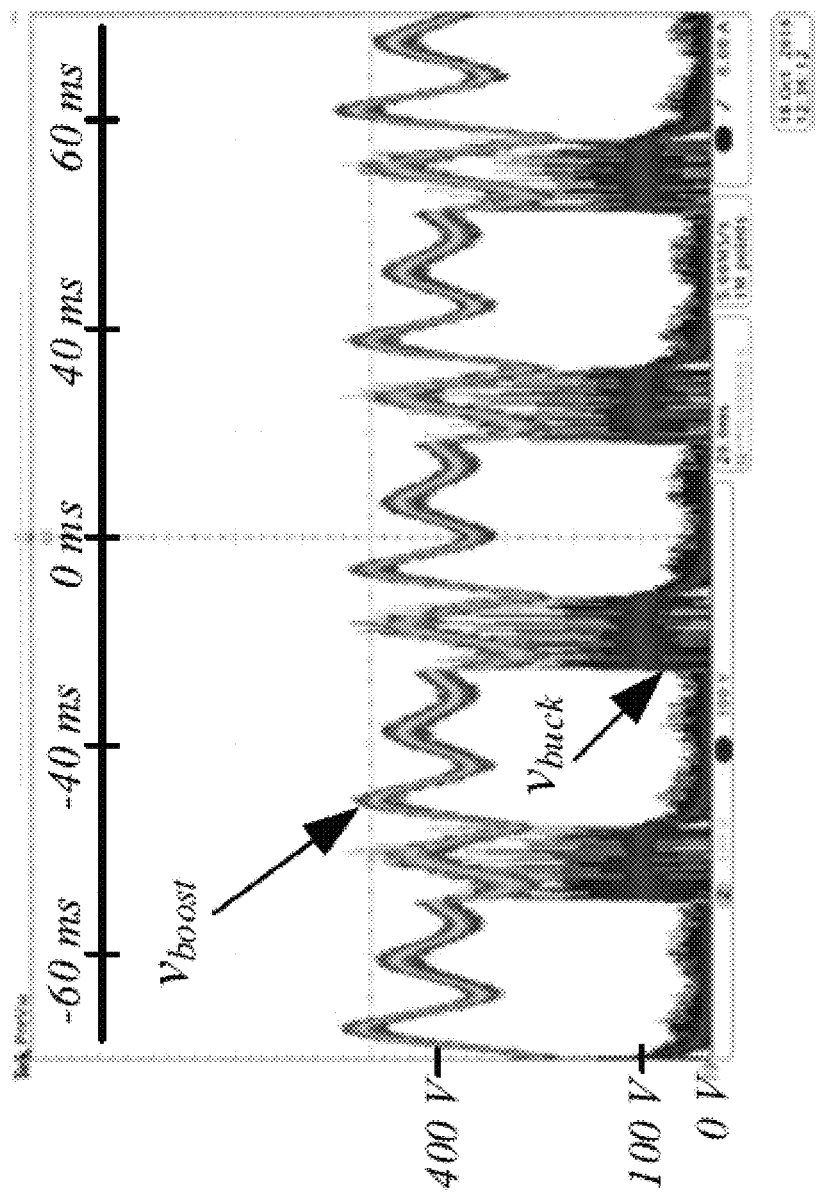
FIG. 17 is a graph of hardware experiment results with $T_p=0.44$ s, $D_p=0.33$, $V_{buck,ref}=100$ V and demonstrates scalier variations in the boost voltage. Oscilloscope horizontal scale is 20 ms/division and the vertical scale is 100 V/division.

To further validate and demonstrate the HSSPFC stability approach the circuit shown in FIG. 11 was constructed with parameters from Table II and tested with actual hardware. The buck and boost converter hardware was implemented with a CREE 1.2 kV 50 A CCS050M12CM2 Silicon Carbide Module. The hysteresis control for the buck converter was implemented with a comparator and flip-flop analog circuit. The pulse reference is provided from a function generator. Two experiments were conducted with $D_p$=0.33 and $V_{buck,ref}$=100 V. The first experiment, shown in FIG. 16, has a pulse period of $T_p$=0.54 s while the second in FIG. 17, has a pulse period of $T_p$=0.44 s. It is seen in FIG. 16 that the boost voltage has an average voltage of 400 $V_{dc}$ with a variation of 250 $V_{peak}$. In FIG. 17 the average boost voltage is 400 $V_{dc}$ with a variation of 110 $V_{peak}$. The boost voltage variations in FIG. 17 are smaller than in FIG. 16 due to the timing of the pulse width and illustrates the nonlinear limit cycle behavior of a meta-stable load.

TABLE II

Circuit Parameters for HIL Experiments

| Parameter | Value |
| --- | --- |
| $V_s$ | 200 $V_{dc}$ |
| $R_{L,boost}$ | 0.1 Ω |
| $L_{boost}$ | 10 mH |
| $R_{boost}$ | 100 μF |
| $\lambda_{boost}$ | 50 Ω |
| $L_{buck}$ | 0.5 |
| $R_{buck}$ | 10 mH |
| h | 1 $V_{dc}$ |
| $v_{buck,ref}$ | 158 $V_{dc}$ |

The present invention has been described as a method to provide meta-stable operation of a DC microgrid having a pulsed load. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to provide meta-stable operation of a DC microgrid having a pulsed load, comprising:
   providing a DC microgrid circuit comprising a pulsed load having a power magnitude, duty cycle, and period;
   deriving a Hamiltonian for the circuit comprising the sum of kinetic and potential energies of the circuit;
   deriving a nonlinear limit cycle for the circuit by integrating the time derivative of the Hamiltonian for the period of limit cycle; and
   adjusting the power magnitude, duty cycle, and period of the pulsed load such that the circuit operates at or below the nonlinear limit cycle, wherein the energy generated during the cycle is equal to or less than the energy dissipated during the cycle.

2. The method of claim 1, wherein the DC microgrid circuit comprises an electric ship power distribution network and the pulsed load comprises a laser, electromagnetic aircraft launch system, railgun, or radar.

3. The method of claim 1, wherein the DC microgrid circuit comprises an electric aircraft power distribution network.

4. The method of claim 1, wherein the DC microgrid circuit comprises a boost converter cascaded with a RC passive load, followed by an active power electronics buck converter.

5. The method of claim 1, further comprising adding energy storage to the DC microgrid to provide a desired margin of safety.

* * * * *